June 11, 1963 K. GERBIG 3,093,813

ELECTRONIC SWITCH

Filed Dec. 17, 1959 2 Sheets-Sheet 1

INVENTOR.
KURT GERBIG

BY

*Nolte and Nolte*
ATTORNEYS

June 11, 1963 K. GERBIG 3,093,813

ELECTRONIC SWITCH

Filed Dec. 17, 1959 2 Sheets-Sheet 2

INVENTOR
KURT GERBIG

BY *Nolte and Nolte*
ATTORNEYS

United States Patent Office 3,093,813

Patented June 11, 1963

3,093,813

ELECTRONIC SWITCH

Kurt Gerbig, Berlin-Treptow, Germany, assignor to VEB Fernmeldewerk Arnstadt, Arnstadt/Thuringia, Germany Filed Dec. 17, 1959, Ser. No. 860,143
9 Claims. (Cl. 340—166)

Figure 1:
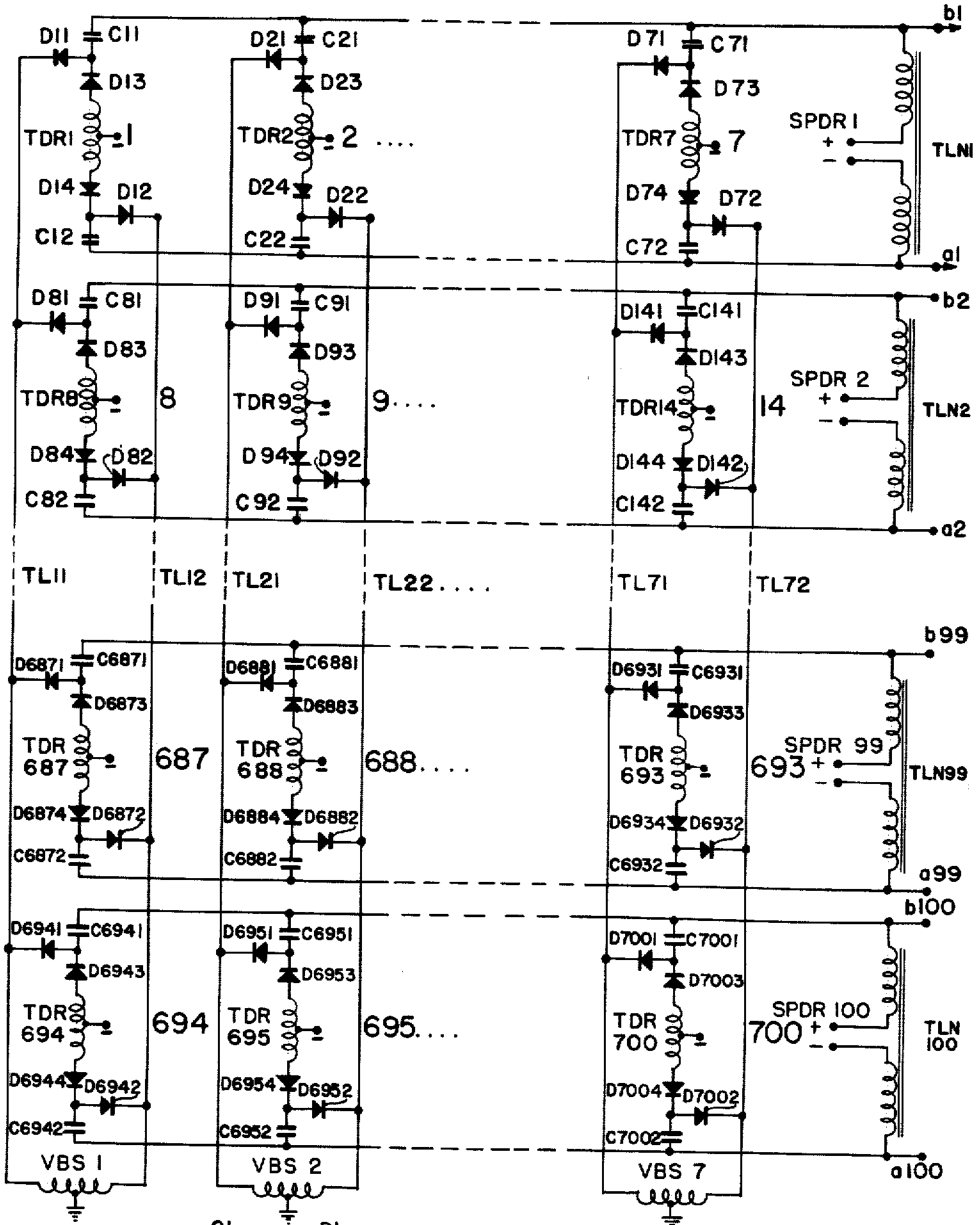

The present invention relates to electronic switches, and more particularly to electronic switches which are free from movable contacts, especially for telephone installations said switches comprising multi-terminal networks of semiconductors, direct current decoupling elements, and electrical chokes.

It is well known to use for telephone installations switches which are free from movable contacts. These switches comprise biased semiconductors such as silicon-junction diodes which are switched from their non-conducting state (open switch) into their conducting state (closed switch) by changing the polarity of the voltage connected to the diode. This changing of polarity is achieved by adding to the biasing voltage a voltage of opposite polarity and of larger amplitude. Since the additional voltage is of opposite polarity, and its amplitude larger than the biasing voltage, the resultant voltage changes polarity and the switch is closed, accordingly.

It is a drawback of such switches that a bridge circuit consisting of transformers must be provided between each subscriber's line and each trunk, since said bridge circuits involve a large number of parts. Another drawback of such circuits is the damping loss caused by said transformers in the talking circuits of the telephone system. In addition, a special control device, a so-called ferro-resonance flip-flop choke circuit, must be provided in order to supply an appropriate voltage to the switch by way of said bridge circuits. This is still another drawback since the ferro-resonance flip-flop circuit consumes a considerable amount of control power.

In this connection it is also known to employ impulse controlled devices with gas discharge tubes which, however, require a high operating voltage.

It is, therefore, an object of the present invention to provide an electronic switch which will overcome the above-mentioned drawbacks.

It is another object of this invention to avoid damping losses caused by transformers in the talking circuits of a telephone system.

It is still another object of this invention to avoid moving contacts in the talking circuit of a telephone system and to provide instead electronic switching means for such a system.

It is another object of this invention to make use of such semiconductors which change from one working state into another as a result of an increase or a decrease of the voltage connected to these diodes. For instance "Zener diodes," "Duobase diodes," and "Shockley diodes" have a characteristic as outlined above.

It is a further object of this invention to provide switching means for switching cross connections in telephone systems.

It is a still further object of this invention to provide an electronic switch suitable to build up switching means based on co-ordinate principle.

It is another object of this invention to provide an electronic switch suitable for use as an input circuit for other switching means, and particularly for co-ordinate switches consisting of electronic switching means.

Figure 2:
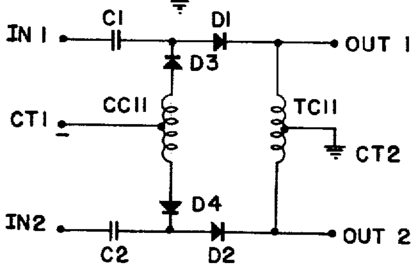
Figure 3:
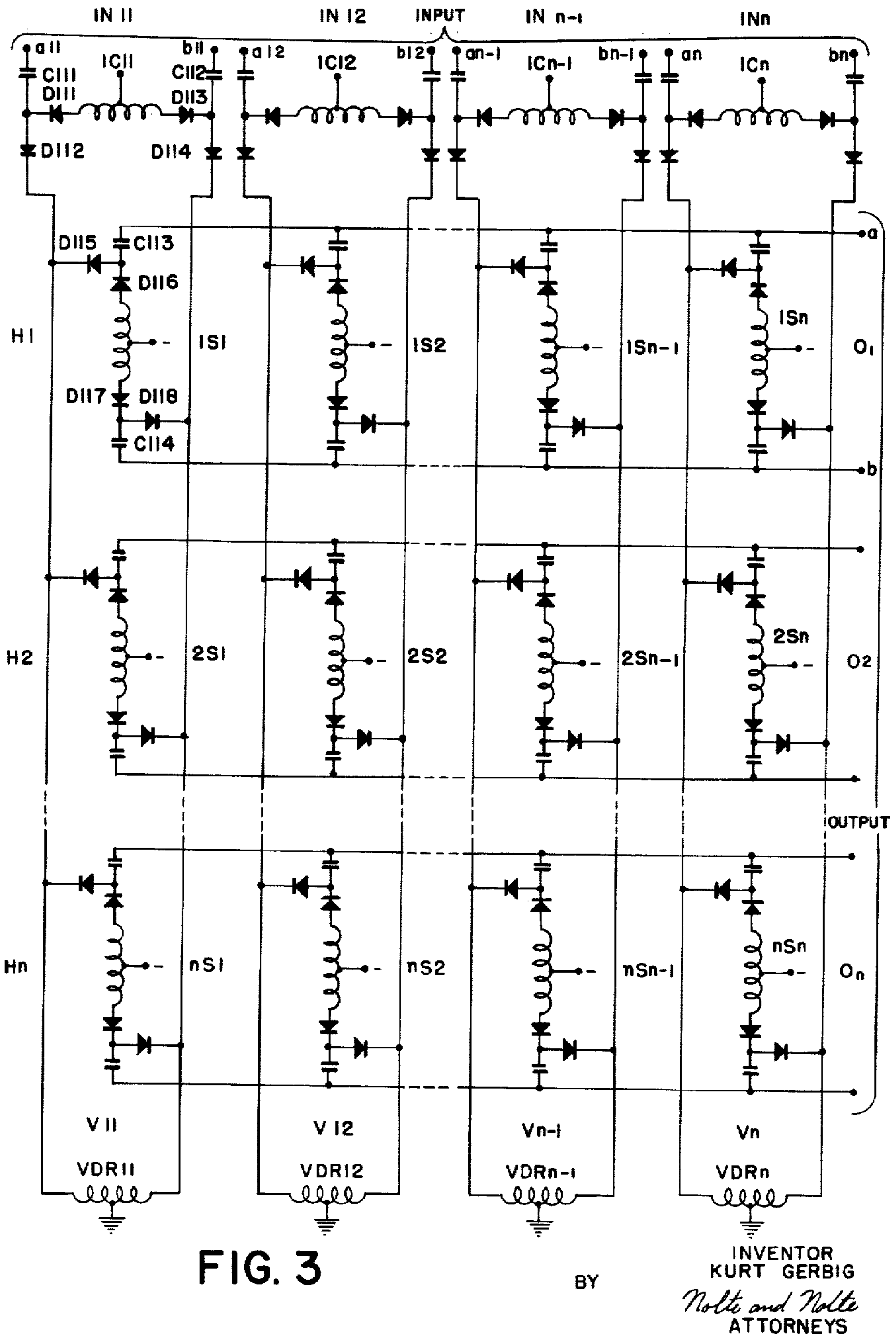

These and other objects and advantages of the invention will appear more clearly from the following specification in connection with the accompanying drawings, wherein FIG. 1 illustrates an electronic switch according to the invention;

FIG. 2 shows the application of the switch according to the invention in a subscriber installation with 100 extension stations; and FIG. 3 shows the application of the switch according to the invention in a co-ordinate switching device with as many input terminals as output terminals, said co-ordinate switching device being provided with input circuits which are eletcronic switches according to the invention.

FIG. 1 shows a six-terminal switching network having, according to the invention, two input terminals IN1 and IN2, two output terminals OUT1, and OUT2, and two control terminals CT1 and CT2. Furthermore, the electronic switch includes two series components. The upper series component comprises the capacitor C1 and the semiconductor D1, e.g. a Zener diode, connected in series with said capacitor C1. The upper series component connects the input terminal IN1 to the output terminal OUT1. The lower series component comprises the capacitor C2 and the semiconductor D2 connected in series with said capacitor C2. The lower series component connects the input terminal IN2 to the output terminal OUT2.

The switch also includes a shunt component comprising two semiconductors D3 and D4 (for instance Zener diodes) and a control choke CCH with a centertap representing said control terminal CT1. The control choke CCH is connected in series with the anode terminals of the two semiconductors D3 and D4, which are connected with their cathode terminals to the junction points between the capacitor C1 and the semiconductor D1, and between the capacitor C2 and the semiconductor D2, respectively. The semiconductors D1 and D2 are connected with their anode terminals to said junction points and with their cathode terminals to the output terminals OUT1 and OUT2, respectively. The output terminals OUT1 and OUT2 are shunted by a terminating choke TCH with a centertap representing said second control terminal CT2.

According to the invention it is possible to use a single terminating device for more than one electronic switch. In this case the output terminals of all switches to be terminated are connected in parallel. Such a terminating device, for instance, may be a choke in a trunk.

The switch described above works as follows:

With the control terminal CT2 connected to ground and the control terminal CT1 connected to a negative potential large enough to keep the Zener diodes in their non-conductive state the switch is open. The switch is closed by supplying a voltage to the control terminal CT1 large enough to move the working points of the Zener diodes into the Zener region whereby diodes D3 and D4 become conductive to short out the input terminals.

According to the invention it is also possible to control the function of the switch with a pulse. For instance, the leading flank of the pulse would open the switch and the trailing flank of the same pulse close the switch in the manner described above.

Having described the invention by way of example of the basic electronic switch, the following description of FIG. 2 gives an example of an application of the new switch in a subscriber's installation with one hundred extension stations TLN1, TLN2, . . . TLN100, and with seven trunks. Accordingly, the installation has seven hundred cross connecting points. FIG. 2 shows the cross connecting points 1, 2, 7, 8, 9, 14, 687, 688, 693, 694, 695, and 700. The cross connecting points of said installation are arranged in the manner of a coordinate system with transversally arranged lines. Each extension station TLN1, TLN2 and so on up to TLN100 is connected to a subscriber's line, comprising a tip wire *a*1, *a*2 . . . *a*100 and a ring wire *b*1, *b*2 . . . *b*100. Said subscriber lines are shown as being arranged horizontally. The seven trunks, of which the chokes VBS1, VBS2 and VBS7 are shown, are connected to seven trunk lines TL11, TL12, TL21, TL22 . . . up to TL71, and TL72 which are shown as being arranged vertically.

Each cross connecting point comprises an electronic switch according to the invention. All of these switches are identical and each includes a control choke TDR1, TDR2 . . . provided with a centertap connected to a negative voltage. Furthermore, each switch includes four Zener diodes D11, D12, D13, D14; D21, D22, D23, D24; . . . D7004 and two capacitors C11, C12; C21, C22 . . . C7002 as shown in FIGURE 1. For each set of one hundred switches in the cross connecting points one terminating choke VBS1, VBS2 . . . VBS7 is provided in the trunk.

All output terminals of switches assigned to the same vertical trunk line are connected in parallel with said vertical trunk line. For instance, the output terminals of the switches 1, 8 . . . 687, 694 are connected in parallel to the vertical trunk line TL11, TL12 and are terminated by the choke VBS1. The centertaps of the terminating chokes VBS1, VBS2 . . . VBS7 are connected to ground and the chokes are connected in parallel to the corresponding trunk line.

The input terminals of the switches assigned to the same subscriber line are also connected in parallel with the subscriber line. For instance, the input terminals of the switches 1, 2 . . . 7 are connected in parallel to the subscriber line represented by the wires *a*1, *b*1. This horizontal line in turn is connected in parallel to the output of the extension station TLN1.

The Zener diodes and the capacitors function as direct current decoupling elements, since each trunk line is fed with the proper voltage by way of a feeding choke SPDR1, SPDR2, . . . SPDR100.

If, for example, somebody wants to talk from extension station TLN1 to somebody via extension station TLN100, the negative voltage at the centertaps of the chokes TDR1 and TDR694 in the switches of the cross points 1 and 694 is moved into the "Zener" region, that is, the absolute value of said voltage is doubled. Thus the proper four Zener diodes D11, D12 and D6941, D6942 become conducting. For this example the following circuit is provided for the talking current: extension station TLN1, wire *b*1, capacitor C11, diode D11, wire TL11, diode D6941, capacitor C6941, wire *b*100 of extension station TLN100 and back via wire *a*100 of extension station TLN100, capacitor C6942, diode D6942, wire TL12, diode D12, capacitor C12, wire *a*1 of extension station TLN1.

The chokes TDR1—TDR700 are designed in such a manner that they present a high impedance to the audio voltage.

All extension stations and trunks which are not taking part in the particular connection are disconnected from the existing connection by the diodes that remain in their non-conducting state, e.g. D81, D82, D6871, D6872, D6951, D6952 etc.

FIG. 3 shows, by way of example, another application of the new switch. It illustrates a co-ordinate switch having as many input terminals IN11, IN12, . . . IN*n*–1, IN*n* as output terminals O1, O2, . . . O*n*. The switch has transversally arranged horizontal and vertical branches, comprising as many horizontal branches H11, H12, . . . H*n* as vertical branches V11, V12 . . . V*n*–1. Additionally, the switch includes at each of its cross connections between the horizontal branches and the vertical branches an electronic switch 1S1, 1S2 . . . *n*S*n* according to the invention. The particulars of these switches are described with reference to FIG. 1 above.

Furthermore, the co-ordinate switch may be provided with special input circuits 1C11, 1C12 . . . 1C*n* which are also electronic switches as outlined above. One input switch is provided for each vertical branch V11, V12 . . . V*n*, in such a manner that its input terminals represent the input terminals of the corresponding vertical line of the co-ordinate switch. The output terminals of said input switches are connected in parallel with the output terminals of the switches assigned to the same vertical branch. One input switch and all switches in the corresponding vertical line are terminated by the same choke VDR. For instance, the input switch 1C11 and all switches assigned with their output terminals to the vertical branch V11 are terminated by the same choke VDR11.

It is possible to form link connections with co-ordinate switches as described above by connecting such switches in parallel and/or series with each other.

The input circuits which are connected between the input terminals of the co-ordinate switch and its vertical branches serve for coupling purposes, e.g., to couple the properly matched output of a subscriber's station to the co-ordinate switch, or to couple the output of a preceding co-ordinate switch to an input of the following co-ordinate switch.

A through connection from one input of the co-ordinate switch to one of its outputs is made as follows: Assuming that the input IN11 is marked busy, the absolute value of the potential at terminal A of input switch 1C11 is doubled and the diodes D111, D112, D113 and D114 start conducting. At the same time the centertap of the choke VDR11 is connected to ground. It is assumed that a connection between input IN11 and output O1 with its terminals *a* and *b* is required. In this case the negative potential at the centertap of the choke in the cross connecting switch 1S1 is also doubled. As a result the diodes D115, D116, D117 and D118 start conducting and the connection between input I*n*11 and output O1 is completed.

In this case the circuit for the talking current is provided as follows: terminal *a*11, capacitor C111, diode D112, diode D115, capacitor C113, output terminal *a* of output O1, and back through output terminal *b* of output O1, capacitor C114, diode D118, diode D114, capacitor C112, input terminal *b*11. The chokes are designed in such a manner that they present a high impedance to the audio voltage.

In case two-base or "Shockley" diodes are used in switch arrangements described above, the flank changes of pulses provide proper control means for switching the diodes from their non-conducting state to their conducting state. Particularly in this instance gas discharge tubes which require a high operating voltage are avoided.

It is, of course, to be understood that the present invention is, by no means, limited to the particular arrangements shown in the drawings but also comprises any modification within the scope of the appended claims.

What I claim is:

1. An electronic switch free from movable contacts, particularly for telephone installations, comprising two input terminals, two output terminals, and two additional terminals, two series components each comprising a direct current decoupling element series connected to first and second rectifier means respectively, each of said series components connecting an input terminal to an output terminal, a shunt component comprising third and fourth rectifier means and a first choke with a centertap constituting the first of said additional terminals, said choke being connected in series between said third and fourth rectifier means, shunt component being connected between said series components of the network, a second choke with a centertap constituting the second additional terminal, said second choke being connected across said output terminals, and control means connected to the centertap of said first choke.

2. An electronic switch as specified in claim 1, wherein said control means includes a source of control pulses operable to control the state of said switch.

3. An electronic co-ordinate switching circuit comprising a matrix of N input branches and M output branches wherein at each of the junctions of said matrix there is an electronic switch having two input terminals, two output terminals, and two additional terminals, said switch further including two series components each comprising a direct current decoupling element and a diode connected in series, between an input terminal and an output terminal, and a shunt component comprising two additional diodes and a choke with a centertap constituting the first of said additional terminals connected in series between said two additional diodes, said shunt component being connected in circuit between said series components of the network, said co-ordinate switch having a number of electronic switches in each input branch equal to the number of output branches, all of the input terminals of said switches assigned to the same input branch being connected in parallel with each other, choke coils, and all of the output terminals of said switches assigned to the same output branch being connected in parallel with one of said choke coils, each of said choke coils having a centertap constituting said second control terminal for the switches connected thereto, and control means connected to said first and second control terminals.

4. An electronic co-ordinate switching circuit comprising a matrix of *n* input branches and *n* output branches wherein at each of the junctions of said matrix there is an electronic switch, each electronic switch having two input terminals, two output terminals, and two additional terminals, said switch further including two series components each comprising a direct current decoupling element and a diode connected in series between an input terminal and an output terminal, and a shunt component comprising two additional diodes and a choke with a centertap constituting the first of said additional terminals, connected in series between said two additional diodes, said shunt component being connected in circuit between said series components of the network, all of the input terminals of the switches that are assigned to the same output branch being connected in parallel with each other, all of the output terminals of the switches assigned to the same input branch being connected in parallel, and a single choke coil connected across each input branch, each of said coils having a centertap constituting the second additional terminal.

5. An electronic switching means comprising co-ordinate switches as specified in claim 4, said co-ordinate switches being connected in parallel.

6. An electronic switching means comprising co-ordinate switches as specified in claim 4, said co-ordinate switches being connected in series thus forming links in a link connection of switches.

7. An electronic switch with first and second input terminals and first and second output terminals comprising first capacitor means and first rectifying means series connected between said first input terminal and said first output terminal, second capacitor means and second rectifier means series connected between said second input terminal and said second output terminal, a shunt circuit connected between the junction of said first capacitor means and said first rectifier means and the junction of said second capacitor means and said second rectifier means, said shunt circuit comprising a plurality of semiconductor devices connected in series with a first choke coil having a center tap, means for applying a voltage to said center tap to cause said semiconductor devices to become non-conducting whereby said switch is opened, and means for applying a second voltage to said center tap to cause said semiconductor devices to become conductive whereby said switch is closed.

8. An electronic switch with first and second input terminals and first and second output terminals comprising first capacitor means and first rectifying means series connected between said first input terminal and said first output terminal, second capacitor means and second rectifier means series connected between said second input terminal and said second output terminal, a shunt circuit connected between the junction of said first capacitor means and said first rectifier means and the junction of said second capacitor means and said second rectifier means, said shunt circuit comprising a plurality of Zener diodes connected in series with a first choke coil having a center tap, means for applying a voltage to said center tap to cause said Zener diodes to become non-conducting whereby said switch is opened, means for applying a second voltage to said center tap to cause said Zener diodes to become conductive whereby said switch is closed, and a second choke coil connected across said first and second output terminals.

9. The device as claimed in claim 8 wherein one of said Zener diodes is directly connected to each of said junctions.

References Cited in the file of this patent

UNITED STATES PATENTS

| | | |
|---|---|---|
| 2,535,303 | Lewis | Dec. 26, 1950 |
| 2,782,307 | Von Sivers | Feb. 19, 1957 |
| 2,810,081 | Elliot | Oct. 15, 1957 |
| 2,855,524 | Shockley | Oct. 7, 1958 |
| 2,901,547 | Miloche | Aug. 25, 1959 |
| 2,951,125 | Anerews | Aug. 30, 1959 |
| 3,027,524 | May | Mar. 27, 1962 |

UNITED STATES PATENT OFFICE

CERTIFICATE OF CORRECTION

Patent No. 3,093,813 June 11, 1963

Kurt Gerbig

It is hereby certified that error appears in the above numbered patent requiring correction and that the said Letters Patent should read as corrected below.

Column 4, line 69, after "means," insert -- said --; column 5, line 21, for "choke coils" read -- M choke coils --.

Signed and sealed this 24th day of December 1963.

(SEAL)
Attest:

ERNEST W. SWIDER
Attesting Officer

EDWIN L. REYNOLDS
Acting Commissioner of Patents